Aug. 11, 1925.
L. C. MARSHALL
1,549,201
MULTIPLE PART PISTON RING
Filed Dec. 31, 1921   2 Sheets-Sheet 2
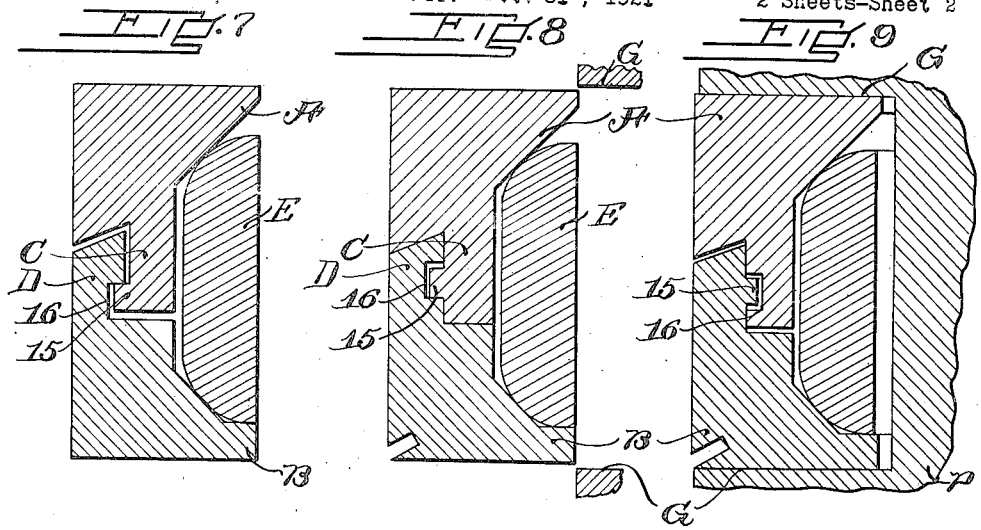
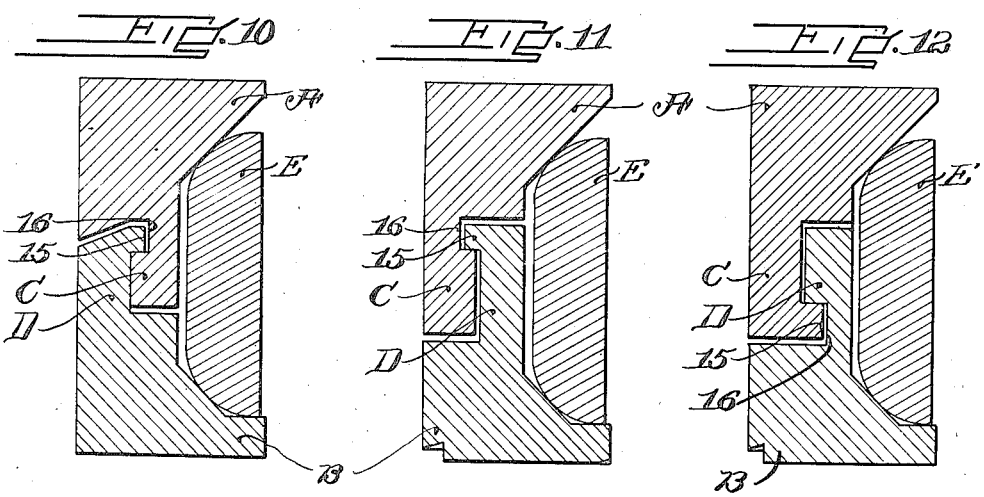
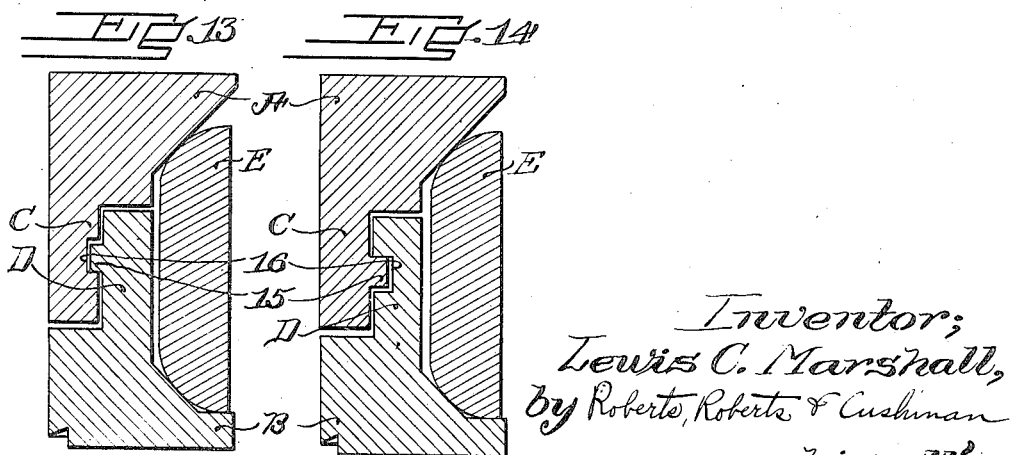
Inventor;
Lewis C. Marshall,
by Roberts, Roberts & Cushman
his attys.

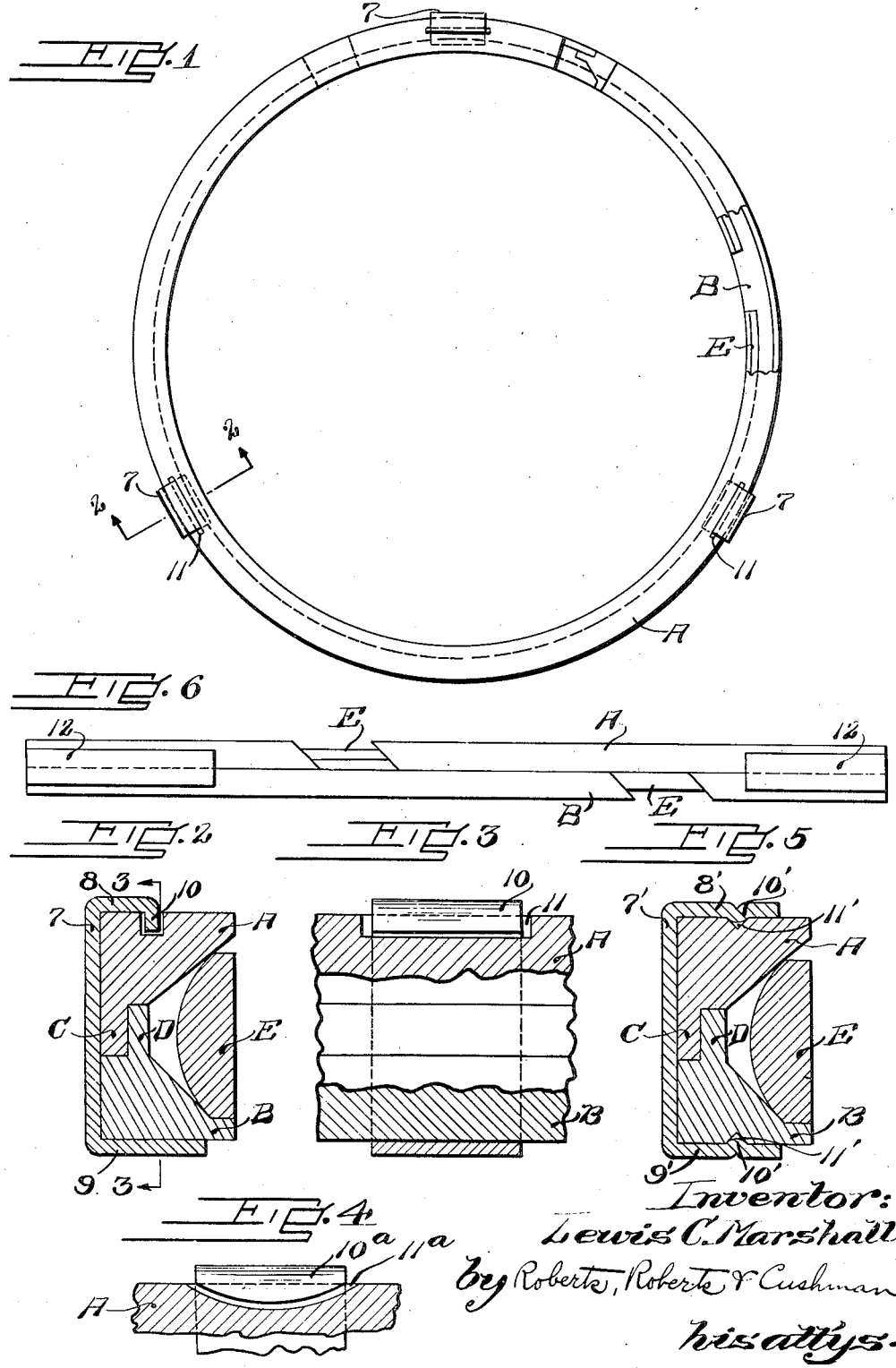

Patented Aug. 11, 1925.

1,549,201

UNITED STATES PATENT OFFICE.

LEWIS C. MARSHALL, OF WALPOLE, MASSACHUSETTS, ASSIGNOR TO PRESSURE PROOF PISTON RING COMPANY, OF BOSTON, MASSACHUSETTS, A CORPORATION OF MASSACHUSETTS.

MULTIPLE-PART PISTON RING.

Application filed December 31, 1921. Serial No. 526,318.

*To all whom it may concern:*

Be it known that I, LEWIS C. MARSHALL, a citizen of the United States of America, and resident of Walpole, in the county of Norfolk and State of Massachusetts, have invented new and useful Improvements in Multiple-Part Piston Rings, of which the following is a specification.

This invention relates to piston rings and more particularly to piston rings formed in two or more parts. One type of piston ring to which the present invention is applicable, shown in each of my prior Patents 1,361,393, granted December 7, 1920, and 1,367,405 granted February 1, 1921, comprises a piston ring proper made in two axially overlapping parts with an annular recess therebetween forming a seat for a spring follower adapted to expand the ring parts both radially and also axially away from each other against the walls of the piston ring groove.

Multiple part piston rings possess a number of advantages over the single ring such as better sealing resulting in more power and reduced consumption of fuel, also absence of ring slap by reason of the longitudinal separation of the parts to completely fill the piston groove. Considerable difficulty, however, has been experienced in properly installing such rings. Heretofore it has been customary to install each part of such a ring separately in the piston ring groove. This method is not only time-consuming but often causes uneven distortion of the parts, which are relatively light as compared with the ordinary piston ring, so that they do not interfit properly when assembled in the groove.

One object of this invention is to improve the method of installing multiple part piston rings by first assembling the ring and then inserting it as a unit into its groove. A further object is to provide means for retaining rings of this kind in assembled relation before and during installation.

The retaining means may be a strip of thin flexible material, such as paper or cloth of sufficient strength, coated or impregnated with adhesive and applied to the exterior face of the assembled ring, or it may comprise spring clips made of suitable material such as sheet metal, celluloid, fibre, etc., removably gripping the top and bottom of the assembled ring. The spring clips preferably have means preventing them from being readily displaced such as an inturned hook end entering a groove in one of the rings or slight projections cooperating with depressions or recesses in the rings. In its preferred form, however, the invention comprises interfitting or interlocking means on the rings themselves for holding the latter when assembled against lateral separation. A retainer in the form of a circumferentially projecting rib or flange, or a series of circumferentially disposed projections upon one ring cooperate with a circumferential recess or a series of circumferentially disposed recesses respectively in the other ring.

In order to illustrate the invention typical species of the genus constituting the invention are shown by way of example in the accompanying drawings, in which,—

Fig. 1 is a plan view of one form of the invention;

Fig. 2 is a sectional view on the line 2—2 of Fig. 1;

Fig. 3 is a section on the line 3—3 of Fig. 2;

Fig. 4 is a fragmentary sectional view similar to Fig. 3 showing a modification;

Fig. 5 is a sectional view similar to Fig. 2 showing a modification;

Fig. 6 is a side elevational view showing still another modification;

Fig. 7 is a sectional view similar to Fig. 2 showing a further modification;

Fig. 8 is a sectional view of another modification showing the ring about to be inserted in the piston groove;

Fig. 9 is a similar section of a further modification showing the packing within the piston groove; and Figs. 10, 11, 12, 13 and 14 are sectional views similar to Figs. 2 and 7 showing other modifications.

The invention is illustrated in connection with the type of piston ring disclosed in applicant's above identified patents, which comprises a base ring A and a crown ring B these rings having interfitting annular flanges C and D. Rings A and B have plane outer faces to contact the cylinder wall and beveled inner faces to form an annular groove in which an expander ring E is received. When this multiple part ring is assembled, it appears in side elevation as shown in Fig. 6, in plan view as shown in Fig. 1, and in section as shown in Figs. 2 and 5.

In the embodiment of the invention shown in Figs. 1 to 4, a plurality of spring clips 7, substantially U-shaped and of metal or other suitable material, are applied to the above described ring after it is assembled but preferably before the follower spring E is inserted. While any desired number of these clips may be used, it has been found that three is amply sufficient for the purpose. Spring clips 7 have substantially parallel ends 8 and 9. End 8 is bent inwardly as shown in Fig. 2 to form a hook 10 fitting in a slot 11 cut in the outer face of either ring A or ring B, in this instance ring A. The forming of hook 10 upon end 8 makes the latter somewhat shorter than the opposed parallel end 9 as clearly shown in Fig. 2. Slot 11 in the ring may be rectangular in form as shown in Fig. 3 or curved as shown at 11ª in Fig. 4, the hook in each case being correspondingly shaped, that is, rectangular in Fig. 3 and curved as shown at 10ª in Fig. 4. The modification of clip 7 shown in Fig. 4 has the advantage that the hook 10ª is easily cammed into and out of slot 11ª by reason of the cooperating curved surfaces by moving the clip laterally, but the form shown in Fig. 3 has the advantage that it cannot be accidentally displaced from the ring by reason of the form of hook 10 and its cooperating groove 11.

The modification shown in Fig. 5 comprises a spring clip 7' having substantially parallel ends 8' and 9'. To retain this clip in place and to oppose accidental displacement thereof slight inward projections 10' are made in parallel ends 8 by punching or otherwise, these projections fitting into shallow recesses 11' in rings A and B. This form of spring retainer possesses the added function of preventing circumferential movement of rings A and B relative to each other.

The modification disclosed in Fig. 6 comprises a single strip or a plurality of strips of tough flexible material 12, such as stout paper or thin cloth, having an adhesive upon one face, applied to the outer faces of rings A and B. If a single strip is used it preferably encircles the ring except for the portion which includes the gaps between the ends of rings A and B respectively. If a plurality of short strips are used, they may be applied at intervals on the periphery of the ring, leaving clear the space so shown in Fig. 6. By this arrangement the parts of the ring are prevented from separating and from rotating relatively to each other but outward expansion of the ring as a whole such as is necessary in forcing it over the piston head, is not interfered with.

The preferred method of installing the above described rings consists in first assembling the rings, then applying a number of spring clips 7 or 7' or adhesive strips 12 to hold the parts of the assembled ring against separation. This is ordinarily done at the time of manufacture when the rings are prepared for shipment so that after the rings leave the factory they may be handled in the same way as single part rings. When employing a separate follower ring, it is preferably inserted after the piston ring parts are secured together and when using adhesive the follower is not inserted until the adhesive has set. The ring as a unit is then forced over the end of the piston until it reaches the piston groove in which the ring is to fit. As the ring snaps into the groove the lower ends of clips 7 will be displaced somewhat from the outer faces of rings A and B since ends 9 are longer than ends 8. To remove the clip 7 a screw driver or other suitable instrument is inserted under the displaced portion of the clip which is then pried from the ring. Another way to remove clip 7 is to insert the end of a suitable instrument under hook 10 and spring it out of groove 11. If a clip having curved hook end such as 10ª shown in Fig. 4 is used, the clip may be moved circumferentially of the ring to cam the hook out of the groove. When modified clip 7' (Fig. 5) is used, the latter will be forced automatically from the assembled ring when the latter snaps into the piston groove. If the strips 12 of adhesive material are used on the ring, they are pulled off or scraped off after the ring is in place in its groove.

The preferred form of the invention, illustrated in the series of modifications shown in Figs. 7–14 inclusive, comprises interlocking or retaining means on the abutting faces of the crown and base rings A and B to hold the latter in assembled relation against the separating action of expanding ring E. While the interlocking or retaining means may be of various forms, the preferred form comprises a circumferential projection or flange 15 upon the flange of one of the interfitting rings cooperating with an annular recess or depression 16 in the flange of the other ring. The recess into which the projection fits is wider than the projection to permit the slight amount of relative movement between the two rings necessary for the inserting of the assembled packing into the piston groove and for the proper functioning of the ring when inserted whereby the interfitting rings are pressed apart by the expander ring to completely fill the piston groove. In the modifications shown in Figs. 7, 8, 12 and 14, projection 15 appears on flange C of crown ring A. In Figs. 9, 10, 11 and 13 the projection 15 occurs on flange D of base ring B. While projection 15 and its cooperating recess 16 are shown in all the figures as rectangular in cross section, it is to be understood that they may be of any other suitable form which will prevent separating movement of the rings laterally when they are in assembled relation. In Figs. 7 and 10–14 inclusive, the rings are shown out of the piston groove, in which condition the expander ring E tends to force rings A and B apart so that the upper face of projection 15 is brought into intimate contact with the upper face of its corresponding recess 16 in Figs. 7, 12 and 14, and the lower face of the projection with the lower face of the recess in Figs. 10, 11 and 13 (due to the slight difference in arrangement) to oppose the separating action of the follower E.

The packings disclosed in Figs. 7–14 are assembled at the factory and shipped in assembled form. The interlock provided by projections 15 and cooperating recesses 16 serves as a retainer to maintain the rings assembled. In order to insert the assembled packing in the piston groove it is expanded as a unit and forced over the end of the piston, and when the piston groove is reached it is pressed together as shown in Fig. 8, thereby permitting the assembled packing to spring into piston groove G of piston P as illustrated in Figs. 8 and 9. When the packing is in the groove as shown in Fig. 9, the projection 15 will be disposed midway of its recess 16 with clearance at either side.

While the interlocking means have been described as a circumferential projection or flange fitting in an annular groove, a series of circumferentially disposed projections, say three or more, cooperating with an annular groove or a series of appropriately spaced recesses would serve equally well. Projections 15 may be made integral with the rings or applied afterwards as by welding or riveting.

By installing multiple part rings as a unit in the manner herein described, the various parts of the ring are expanded equally to practically the same extent so that when the ring snaps into the groove the parts interfit properly.

I claim:

1. In a piston packing, in combination, a pair of independent rings secured together in contacting relationship, said rings having plane cylindrical outer faces and inclined inner faces, and an expanding ring disposed between said inclined inner faces.

2. In a piston packing, in combination, a plurality of coaxial rings having abutting faces, and a spring follower ring interposed between them, the abutting faces of said rings having interlocking elements for holding the rings in assembled relation before and during their insertion in a piston groove.

3. In a piston packing, in combination, a pair of rings having interfitting annular flanges, plane cylindrical outer faces, and inclined inner faces, and an expander disposed between said inclined inner faces, the rings being interlocked to prevent lateral separation thereof under the action of said expander.

4. In a piston packing, in combination, a pair of rings having interfitting annular flanges, plane cylindrical outer faces and inclined inner faces, and an expander disposed between said inclined inner faces, one of the flanges having a projection cooperating with a recess of the other flange for opposing the separating action of said expander.

5. In a piston packing, in combination, a pair of rings having plane cylindrical outer faces, and inclined inner faces, and an expander disposed between said inclined inner faces, one of said rings having a circumferential projection cooperating with an annular recess in the other ring to form an interlock whereby said rings are retained in assembled relation against the separating action of the expander.

6. In a piston packing, in combination, a pair of rings having interfitting annular flanges, plane cylindrical outer faces, and inclined inner faces, and an expander disposed between said inclined inner faces, one of said rings having a circumferential projection on its flange cooperating with an annular recess in the flange of the other ring to form an interlock whereby the rings are retained in assembled relation against the separating action of said expander.

Signed by me at Boston, Massachusetts, this 29th day of December, 1921.

LEWIS C. MARSHALL.